United States Patent
Moros Ortiz et al.

(10) Patent No.: US 10,834,564 B1
(45) Date of Patent: Nov. 10, 2020

(54) LOCATION-BASED TRANSPORTATION SERVICE DURING EMERGENCY SITUATIONS

(71) Applicant: International Business Machines Corporation, Armonk, NY (US)

(72) Inventors: Jorge Andres Moros Ortiz, Melbourne (AU); Harris Basil Monos, Melbourne (AU); Emily J Y Wong, Melbourne (AU); Barbara Rabinowicz, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/666,022

(22) Filed: Oct. 28, 2019

(51) Int. Cl.
*H04W 4/90* (2018.01)
*H04W 4/021* (2018.01)
*H04W 76/50* (2018.01)
*H04W 4/48* (2018.01)
*H04W 4/029* (2018.01)
(Continued)

(52) U.S. Cl.
CPC ............ *H04W 4/90* (2018.02); *G08B 25/016* (2013.01); *G08B 25/10* (2013.01); *H04W 4/022* (2013.01); *H04W 4/029* (2018.02); *H04W 4/48* (2018.02); *H04W 76/50* (2018.02)

(58) Field of Classification Search
CPC ....... H04W 4/90; H04W 4/029; H04W 64/00; H04W 76/50; H04W 4/022; H04W 4/48; G08B 27/001; G08B 25/016; G08B 21/10; G08B 21/18; G08B 7/066; G08B 25/10; H04M 1/72536; H04M 2242/04
See application file for complete search history.

(56) References Cited

U.S. PATENT DOCUMENTS

| | | |
|---|---|---|
| 6,609,064 B1 | 8/2003 | Dean |
| 6,798,343 B2 | 9/2004 | Carrier |
| 7,080,019 B1 | 7/2006 | Hurzeler |

(Continued)

FOREIGN PATENT DOCUMENTS

WO 2018207075 A1 11/2018

OTHER PUBLICATIONS

Wang et al. "Leave Now: A Social Network-based Smart Evacuation System for Disaster Management", 2 pages, Oct. 2016, (Year: 2016).*

(Continued)

*Primary Examiner* — Quoc Thai N Vu
(74) *Attorney, Agent, or Firm* — Michael A. Petrocelli

(57) ABSTRACT

A method, system and computer program product for automatically organizing transportation during an emergency situation includes monitoring, by one or more processors, a first location of a plurality of users. The one or more processors receive a notification of an emergency situation and identifies danger zones within an emergency area associated with the emergency situation. The one or more processors determine a second location of the plurality of users, and in response to the second location being within the emergency area, organize the plurality of users in one or more groups based on the first location and the second location, and automatically coordinate a transportation vehicle for the one or more groups, a route of the transportation vehicle is selected based on the identified danger zones within the emergency area.

20 Claims, 6 Drawing Sheets

(51) Int. Cl.
  *G08B 25/10*   (2006.01)
  *G08B 25/01*   (2006.01)

(56) References Cited

U.S. PATENT DOCUMENTS

| | | | |
|---|---|---|---|
| 7,936,286 | B2 | 5/2011 | Adair |
| 9,513,134 | B1* | 12/2016 | Ishikawa ............... H04W 4/029 |
| 2002/0116242 | A1 | 8/2002 | Vercellone |
| 2006/0047543 | A1 | 3/2006 | Moses |
| 2009/0054029 | A1 | 2/2009 | Hogberg |
| 2017/0167882 | A1 | 6/2017 | Ulloa Paredes |
| 2018/0146351 | A1* | 5/2018 | Newby ................... H04W 4/33 |
| 2018/0204428 | A1 | 7/2018 | Asaro |

OTHER PUBLICATIONS

"UberPool vs. UberX—How Does UberPool Work?", uber.com, © 2019 Uber Technologies Inc., 3 pages, <https://www.uber.com/au/en/ride/uberpool/>.

Helling, Brett, "Lyft Line—What Is It and How Does It Work?", © rideshareapps.com 2019, 3 pages, <https://rideshareapps.com/lyft-line/>.

Mell et al., "The NIST Definition of Cloud Computing", National Institute of Standards and Technology, Special Publication 800-145, Sep. 2011, 7 pages.

Wang, et al., "LeaveNow: A Social Network-based Smart Evacuation System for Disaster Management", arXiv:1610.02869v1 [cs.SI] Oct. 10, 2016, 2 pages, <https://arxiv.org/pdf/1610.02869.pdf>.

* cited by examiner

LOCATION-BASED TRANSPORTATION SERVICE DURING EMERGENCY SITUATIONS

BACKGROUND

The present invention generally relates to the field of data collection and analysis, and more particularly to a method, system and computer program product for automatically organizing and providing means of transportation to individuals during an emergency situation.

Emergencies typically arise with little to no warning. For instance, natural disasters (e.g., earthquakes, hurricanes, etc.) and some manmade situations (e.g., violent attacks, protests, riots etc.) can occur without warning causing casualties and/or property damage. During these situations, it may be difficult for some people to evacuate emergency areas due to a lack or shortage of transportation vehicles. This problem may be aggravated in large and very populated cities. Providing adequate transportation in a quick manner may help saving lives in the event of a natural or manmade disaster. Thus, preparation for emergency situations may facilitate immediate action including the provision of critical transportation services. However, the larger the amount of people to be transported, the harder can be to provide an efficient and fast response. Therefore, methods and systems for providing transportation services during emergency situations would be desirable.

SUMMARY

Shortcomings of the prior art are overcome and additional advantages are provided through the provision of a method for automatically organizing and providing means of transportation to individuals during an emergency situation. The method includes monitoring, by one or more processors, a first location of a plurality of users, receiving a notification of an emergency situation, and identifying danger zones within an emergency area associated with the emergency situation. The one or more processors determine a second location of the plurality of users, and in response to the second location being within the emergency area, organize the plurality of users in one or more groups based on the first location and the second location. The one or more processor automatically coordinate a transportation vehicle for the one or more groups using a transportation route selected based on the identified danger zones within the emergency area.

Another embodiment of the present disclosure provides a computer program product for automatically organizing and providing means of transportation to individuals during an emergency situation, based on the method described above.

Another embodiment of the present disclosure provides a computer system for automatically organizing and providing means of transportation to individuals during an emergency situation, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention generally relates to the field of data collection and analysis, and more particularly to a method, system and computer program product for automatically organizing and providing means of transportation to individuals during an emergency situation. The following described exemplary embodiments provide a system, method, and computer program product to, among other things, automatically classify and create groups of individuals based on determined personal and immediate geographic locations, identify danger zones, and coordinate emergency transportation services to each group of individuals according to a specified location radius. Therefore, the present embodiments have the capacity to improve the technical field of data collection and analysis by organizing and delivering transportation services, based on state-of-the-art navigation and information technology, in an efficient manner that may potentially reduce the number of casualties during emergency situations.

By determining a personal (e.g., home or hotel) location of a plurality of individuals, a location of nearest shelters and/or hospitals, and an immediate location of the plurality of individuals at the time of a disaster, a radius of action can be established and used to organize the plurality of individuals in one or more groups with the same or similar destination point such that transportation can be provided to each of the one or more groups rather than individually, thereby helping the plurality of individuals to evacuate the emergency zone faster and be transported to appropriate destination points.

Figure 1:
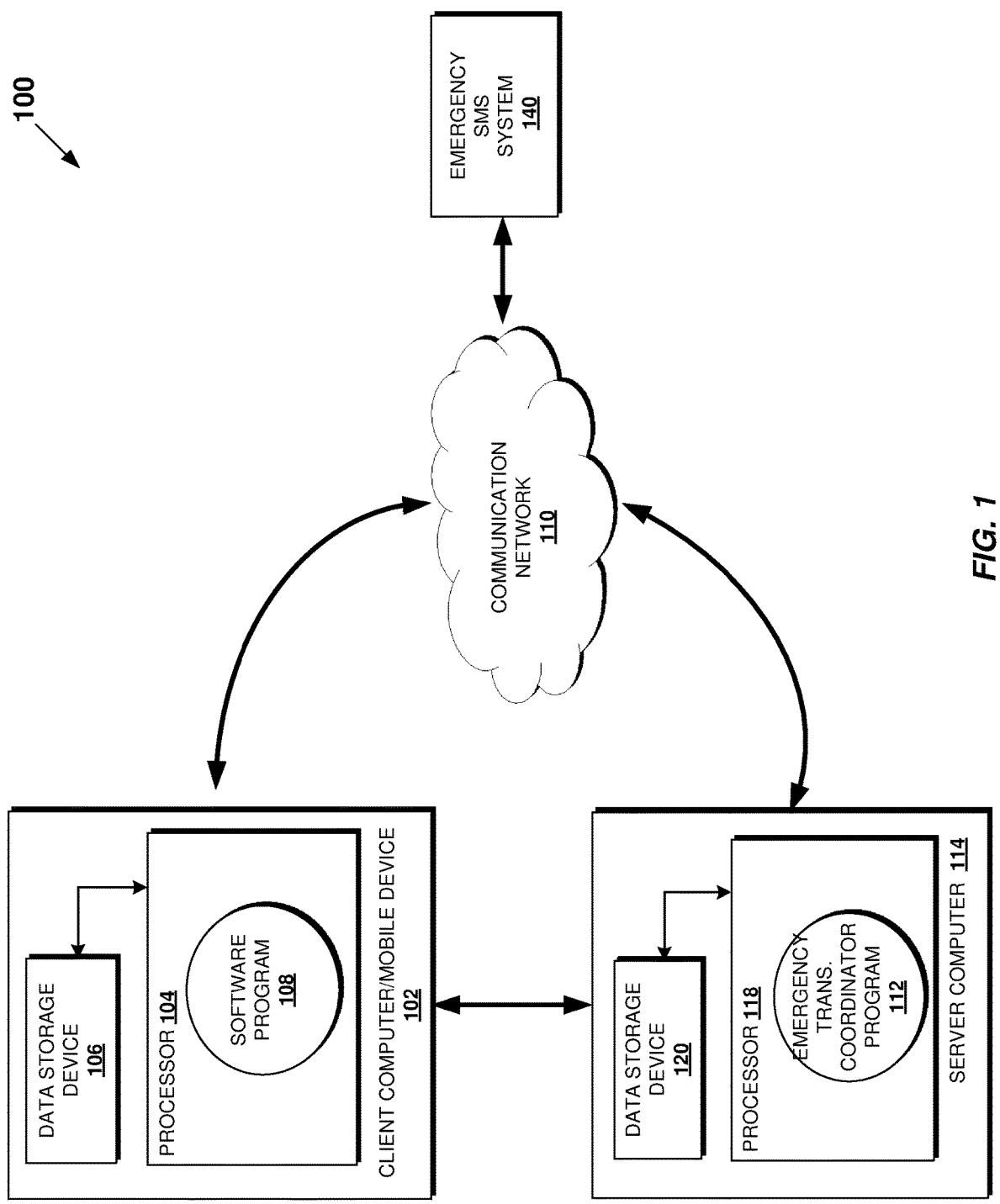
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104 and a data storage device 106 that is enabled to run a software program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118 and a data storage device 120 that is enabled to run an emergency transportation coordinator program 112. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The software program 108 running on client computer 102 may communicate with the emergency transportation coordinator program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

According to an embodiment, both of the client computer 102 and the server computer 114 communicate, via the communication network 110, with an emergency Short Message Service (SMS) system 140. For instance, the client computer 102 may be a mobile device capable of sending and receiving (SMS) text messages. The emergency SMS system may generate and transmit text messages through the communication network 110 to inform about potential or actual emergency situations. It should be noted that in embodiments in which the communication network 110 is a cellular data network, it may likely be available when other communication systems, such as email systems are not. This may provide a more robust system for relaying information to the client computer (mobile device) 102 during an emergency situation. In other embodiments, web-based applications available in substantially all mobile devices or client computer(s) 102 may also be considered during emergency situations to communicate with the client computer(s) 102.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
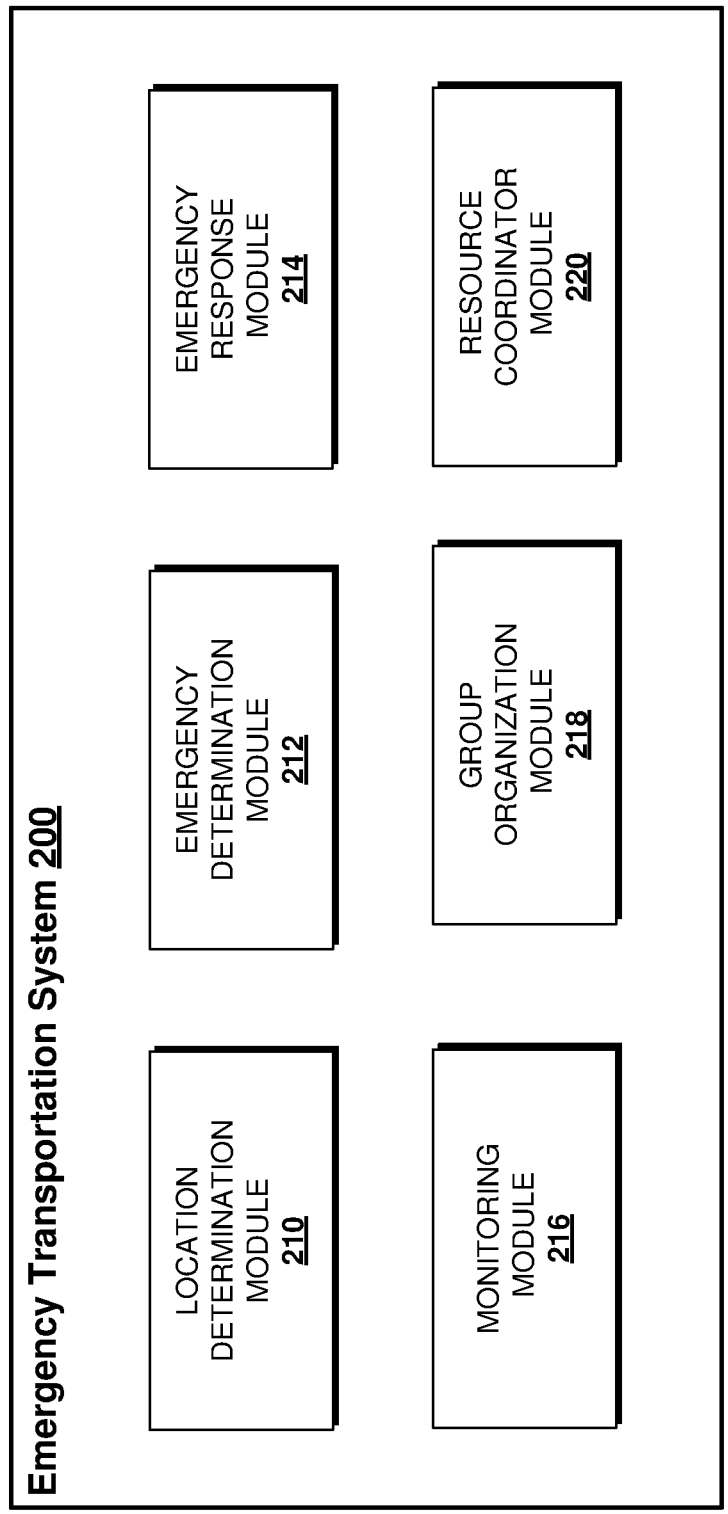
FIG. 2 is a block diagram depicting components of a system for automatically providing alternative transportation services during emergency situations, according to an embodiment of the present disclosure.

Referring now to FIG. 2, a block diagram depicting components of an emergency transportation system 200 is shown, according to an embodiment of the present disclosure. In this embodiment, a location determination module 210 identifies a permanent (or semi-permanent) location of a plurality of individuals via a global positioning system (GPS) functionality of a mobile device (not shown) associated with each of the plurality of individuals. For instance, the location determination module 210 may keep a record of personal (e.g., home, hotel, etc.) addresses associated with the plurality of individuals (hereinafter referred to as "users") via their mobile devices.

It should be noted that data collection is done with the consent of the user(s), for example, an opt-in and opt-out feature. As known by those skilled in the art, an opt-in and opt-out feature generally relates to methods by which a participating status can be modified (i.e., accept or reject the data collection). In some embodiments, the opt-in and opt-out feature can include a software application(s) available in the client computer (mobile device) 102. Additionally, the user(s) can choose to stop having their information being collected or used. In some embodiments, the user(s) can be notified each time data is being collected and can stop the data collection at any time. The collected data is envisioned to be secured and not shared with anyone without consent.

The emergency transportation system 200 further includes an emergency determination module 212 which may communicate with public authorities such as, for example, police force, firefighters, emergency call centers, weather centers, emergency medical services (EMS), local government, and the like. Specifically, the emergency determination module 212 is capable of receiving information regarding potential or actual emergency situations. Additionally, the emergency determination module 212 may identify, using current geographic information technology and data analysis tools, danger zones within the emergency area including, for example, closed streets or roads, overflowed rivers, etc. to be avoided by rescuers (and users) trying to get in or out of the emergency area.

When a disaster or catastrophic event is confirmed, the emergency determination module 212 sends the collected information regarding the emergency area and the type of emergency to an emergency response module 214.

According to the reported danger zones, the emergency response module 214, using GPS and data pertaining to the reported danger zones, proceed to geo-fence a perimeter of the emergency area. More specifically, the emergency response module 214 defines a radius of action (which authorities may pre-configure) within which alternative transport routes can be established and used by the emergency transportation vehicle(s).

In some embodiments, the identified danger zones may be used to select pick-up locations within the emergency area, closest safe locations outside the emergency area, and safe transportation routes for rescue personnel to get in and out of the emergency area.

The emergency response module 214 communicates the collected information to a monitoring module 216 which determines a current or immediate location of the users via the GPS functionality of their mobile devices. The determined current location of the users may be compared to the danger zones identified by the emergency response module 214 to determine if any of the users is located in or near the emergency area.

According to an embodiment, based on the collected information regarding the users and the identified danger zones, a group organization module 218 of the emergency transportation system 200 may organize groups of users based on their current location. Stated differently, the group organization module 218 compiles information from the location determination module 210, the emergency determination module 212, and the emergency response module 214 to classify or divide users into different groups. In an embodiment, the group organization module 218 organizes users in groups based on a distance between the users. For instance, a radius (e.g., r=5 km) is specified by the emergency response module 214, and all users within that radius are included in the same group. In some embodiments, the group organization module 218 can further refine the radius by using the permanent or semi-permanent location information of the users. Thus, users can be selected for a determined group based on having a similar final or end destination (e.g., home, hotel, etc.). In other embodiments, groups may be organized based on a distance to a nearest shelter or hospital.

It should be noted, that the group organization module 218 may first organize the groups of users based on exiting the emergency zone as soon as possible and taking the users to an intermediate safe location determined by the emergency response module 214. Once the users are in the safe intermediate location, the group organization module 218 may reorganize the groups of users or create new groups based on a final destination of the users such as, for example, the personal address identified by the location determination module 210.

In some embodiments, the group organization module 218 may designate secondary stops at which one or more groups of users exiting the emergency area may stop to exchange transportation vehicles. For instance, at these designated secondary stops, additional transportation vehicles may be waiting for the one or more groups of users to be taken to their final destination. By doing this, the use or assignment of transportation vehicles by the emergency transportation system 200, as well as the distribution of users, can be performed in a more efficient way.

Once the group organization module 218 have organized the groups of users, a resource coordinator module 220 makes the organized groups visible to all local authorities capable of providing transportation services. Specifically, the resource coordinator module 220 arrange a pick-up location within the radius specified for each group considering the identified danger zones. The resource coordinator module 220 sends a (SMS) text message to each user within the groups organized by the group organization module 218, and waits for a response accepting or declining the pick-up location. In response to one or more users within a group accepting the pick-up location, the corresponding transport unit(s) are dispatched to the agreed pick-up location. If no response is received from users associated with a group, the emergency transportation system 200 sends a new text message to the next group of users.

Steps of a method for automatically providing alternative transportation services using the proposed emergency transportation system 200 will be described in detail below.

Figure 3:
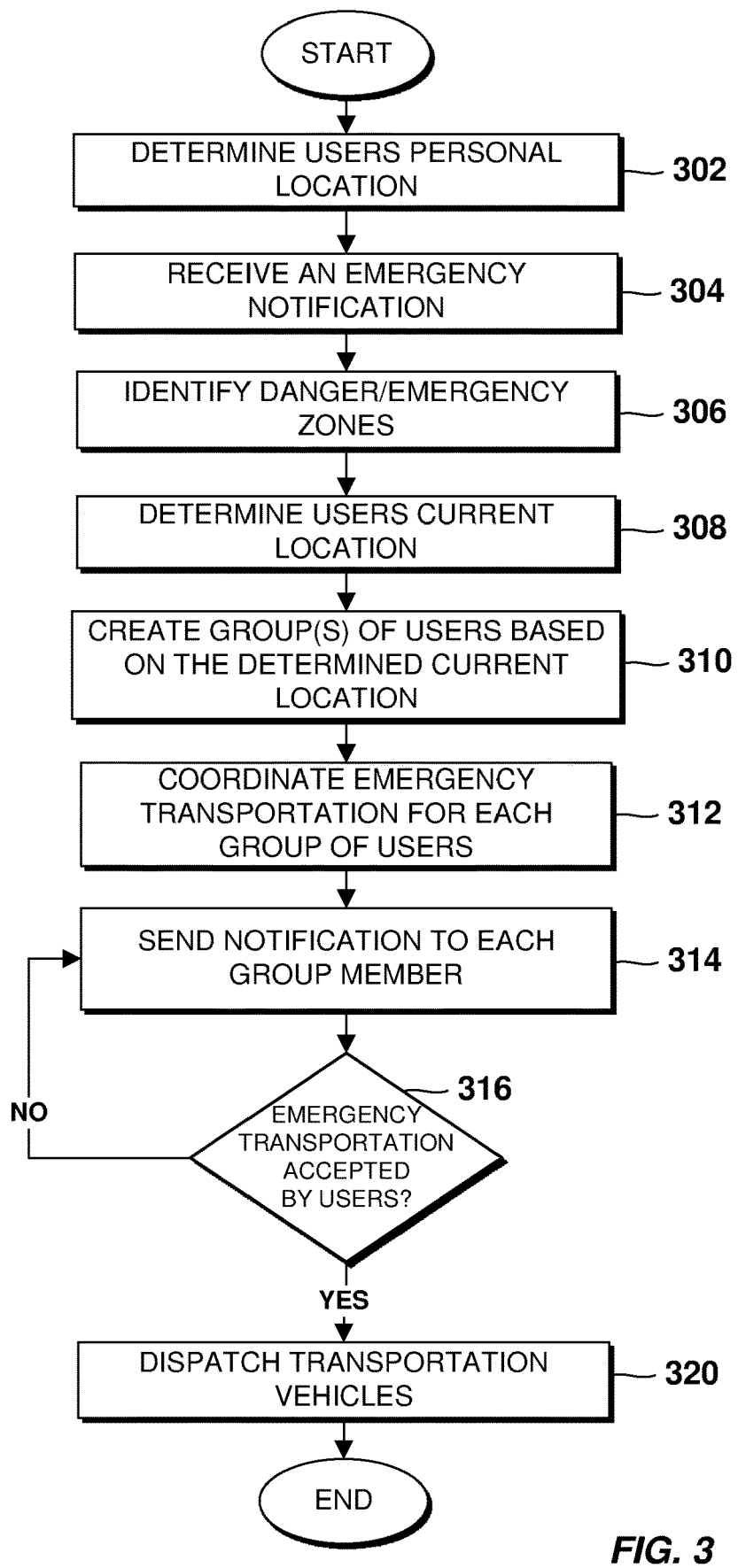
FIG. 3 is a flowchart illustrating the steps of a method for automatically providing alternative transportation services during emergency situations, according to an embodiment of the present disclosure.

Referring now to FIG. 3, a flowchart illustrating the steps of a method for automatically providing alternative transportation services during emergency situations, is shown, according to an embodiment of the present disclosure.

The process starts at step 302 in which a permanent or semi-permanent residence of the users is determined using a mobile device associated with each user. Specifically, a GPS functionality of the mobile devices can be used to monitor or collect information regarding a domicile of the users (e.g., home, hotel, etc.). As mentioned above, the user(s) can choose to stop having their information being collected or used.

At step 304 a notification is received including a warning regarding an emergency situation occurring at a specified emergency area. The emergency situation may include natural disasters (e.g., hurricanes, earthquakes, flooding, and the like) or manmade emergency situations (e.g., fires, transport accidents, industrial accidents, spill of hazardous materials, nuclear explosions/radiation, deliberate attacks, and the like.). At step 306 danger zones within the emergency area are identified. The identified danger zones may be avoided by users and/or rescue services. For example, embodiments of the present disclosure, may identify an area affected by an earthquake together with roads closed by collapsed buildings or bridges.

Once the emergency area and associated danger zones have been identified (at step 306), the process continues with step 308 in which a current or immediate location of the users is determined using the GPS functionality of their mobile devices. Based on one or more users being located in or near the emergency area and danger zones, information including the current location of the users is used at step 310 to create groups of users to be transported outside the emergency area. In an embodiment, the groups of users can be organized based on a radius corresponding to a determined distance from a certain location or between the users. In some embodiments, the radius can be further refined to include users with similar permanent or semi-permanent location information. Thus, users can be selected for a determined group based on having a similar final or end destination (home, hotel, etc.). In other embodiments, groups may be organized based on a distance to a nearest shelter or hospital.

Embodiments of the present disclosure may first organize the groups of users based on taking the users out of the emergency area as quick as possible. In this case, the groups of users can be transported to an intermediate safe location. Once in the intermediate safe location, groups can be reorganized or new groups can be created based on the final destination of each user. The final destination may be the same or similar to the permanent or semi-permanent location determined at step 302.

In some embodiments, one or more groups of users exiting the emergency area may stop at designated secondary stops to exchange transportation vehicles. For instance, at these designated secondary stops, additional transportation vehicles may be waiting for the one or more groups of users to be taken to their final destination. By doing this, the use or assignment of transportation vehicles, as well as the distribution of users, can be performed in a more efficient way.

At step 312, transportation services may be coordinated for each group of users. Specifically, the groups may be visible to emergency transport services, and those services may, via SMS messages, communicate with a first group of users. According to an embodiment, a notification may be transmitted (at step 314) to each member of the first group of users including a possible pick-up location. In response to the first group of users accepting the pick-up location for emergency transportation, the process continues at step 320 by dispatching vehicles to the agreed pick-up location. In an embodiment, by accepting the pick-up location, a list of users that have been transported to a safe location can be created and provided to local authorities.

If no response is received confirming the pick-up location, a new notification is sent to a second group of users.

The proposed embodiments may focus on grouping multiple users that share a similar (immediate) location at the time of the emergency situation, gather these users and exit the danger zones to an intermediate safe location. Once in the intermediate safe location, new groups can be arranged based on a similar or common final destination (e.g., home, hotel, etc.). By doing so, resources may be allocated in a more efficient way. It should be noted that substantially all means of transportation (e.g., air, road, maritime, etc.) available at the time of the emergency situation are considered when arranging the groups of users to be transported to the safe location.

Therefore, the described embodiments provide a method, system, and computer program product to dynamically organize groups of people based on a radius selected according to their current location at the time of an emergency situation and a permanent location with the aim of utilizing transport resources effectively. This may allow entire cities to efficiently respond to emergency situations. Additionally, the proposed system and associated method may facilitate local authorities the coordination of available transportation alternatives, while guaranteeing the safety of rescue personal.

Embodiments of the present disclosure may alternatively be used in other situations in which large amounts of people may participate such as, for example, concerts, games, etc. The coordination of transportation services may be improved by the present embodiments thereby reducing traffic congestion and waiting times.

Figure 4:
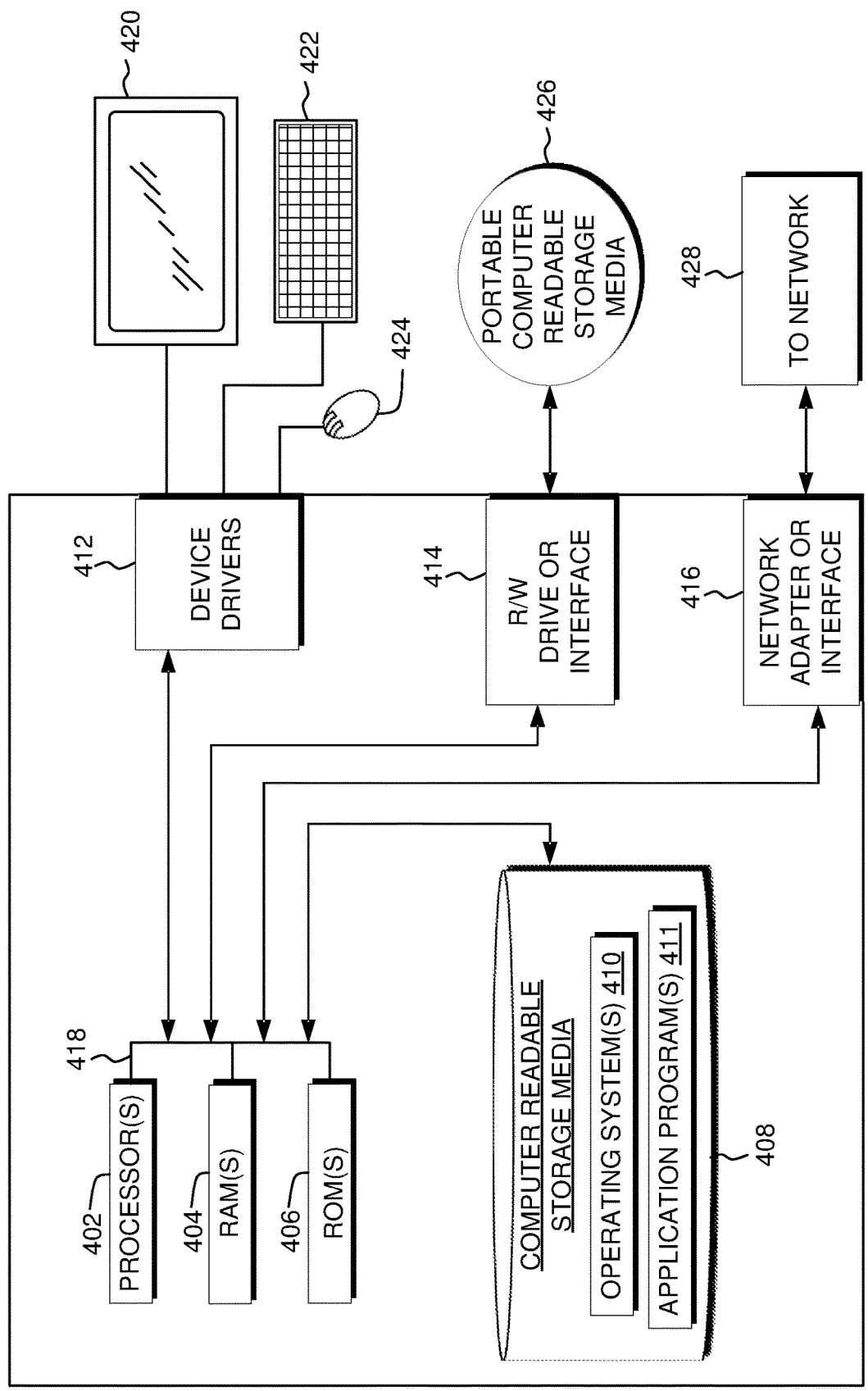
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
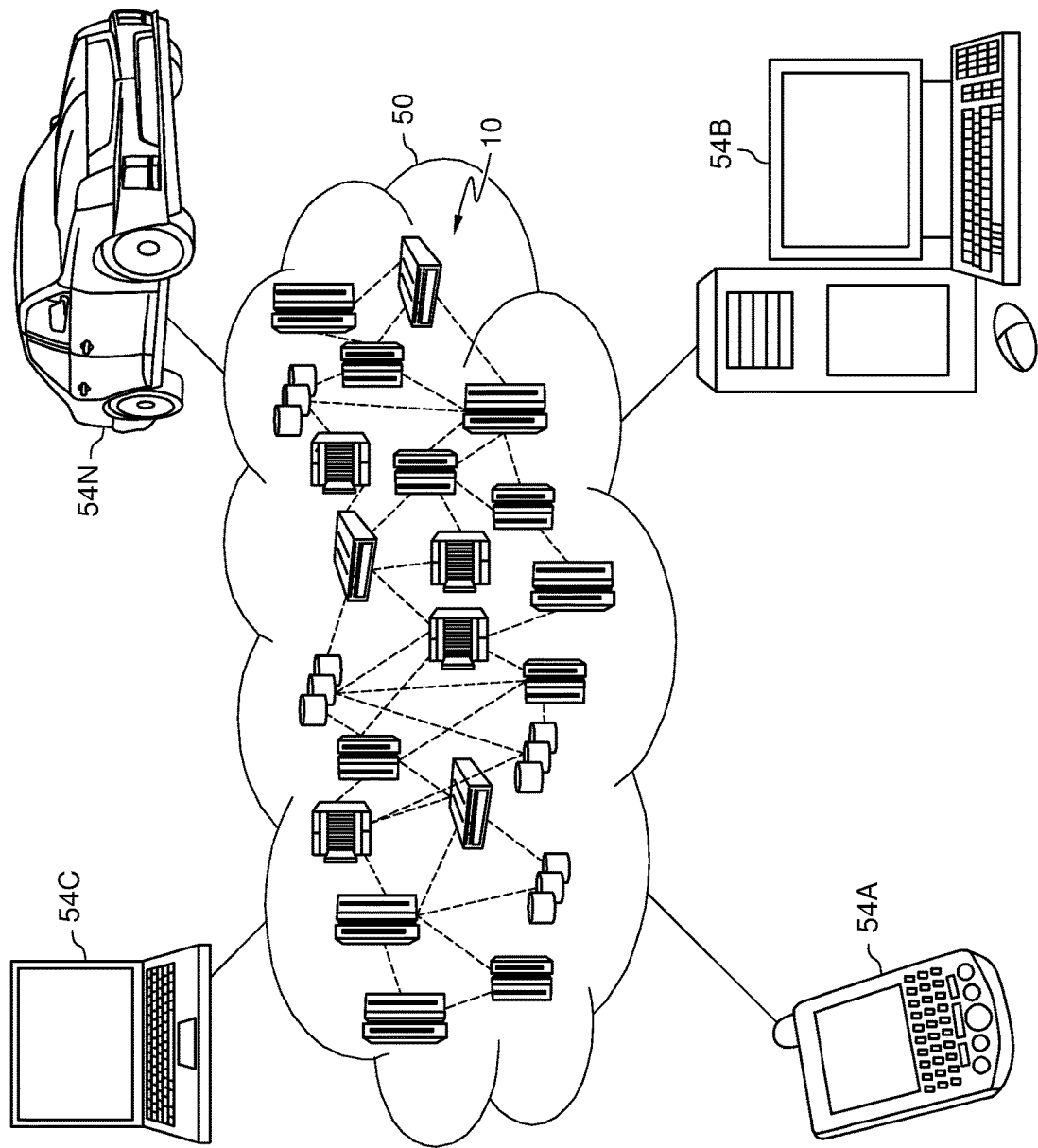
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
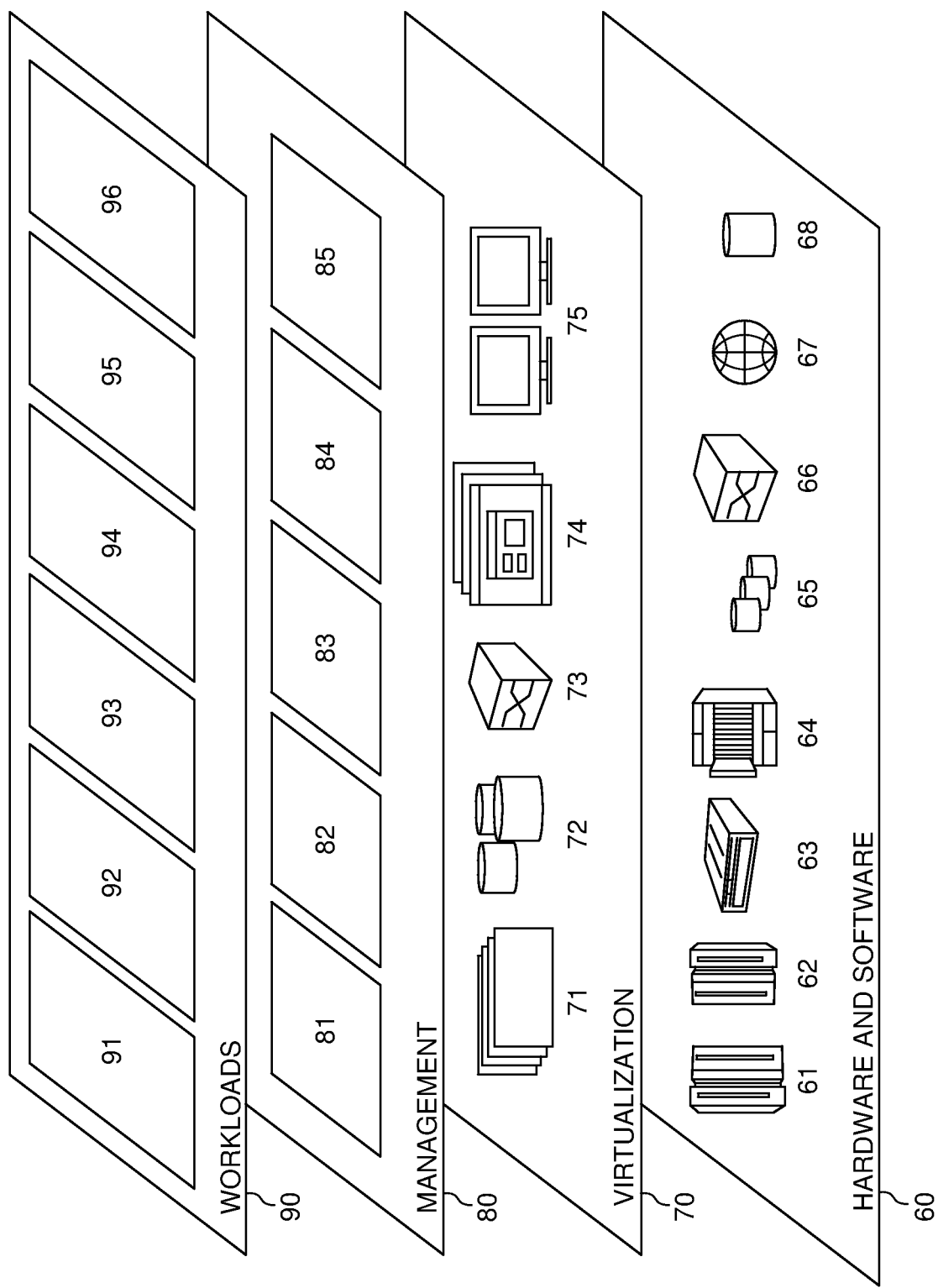
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatically coordinating transportation services during emergency situations 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically coordinating transportation services, comprising:
    determining, by one or more processors, a first location corresponding to a permanent residence of a plurality of users;
    receiving, by the one or more processors, a notification of an emergency situation;
    identifying, by the one or more processors, danger zones within an emergency area associated with the emergency situation;
    in response to receiving the notification of the emergency situation, determining, by the one or more processors, a second location corresponding to an immediate location of each of the plurality of users;
    in response to the second location matching the emergency area, identifying, by the one or more processors, a safe location in close proximity to the emergency area and a safe evacuation route from the emergency area to the safe location;
    organizing, by the one or more processors, the plurality of users in one or more groups based on a radius selected according to at least one of a proximity to the safe location, a proximity between the second location of at least two users of the plurality of users, and at least two or more users sharing the first location;
    based on the identified danger zones, designating, by the one or more processors, a pick-up location for each of the one or more groups;
    notifying via a Short Message Service (SMS), by the one or more processors, each user in the one or more groups of the designated pick-up location;
    in response to the one or more groups accepting the designated pick-up location, automatically coordinating, by the one or more processors, a first transportation vehicle to take each of the one or more groups from the emergency area to the safe location; and
    creating, by the one or more processors, a list of users from the one or more groups taken to the safe location to be provided to local authorities.

2. The method of claim 1, wherein the first location and the second location are determined using a global positioning system.

3. The method of claim 1, wherein the first location further comprises a semi-permanent residence of each of the plurality of users and the safe location comprises shelters, hospitals, and the like.

4. The method of claim 1, further comprising:
    in response to the one or more groups arriving to the safe location, determining, by the one or more processors a final destination of each user in the one or more groups; and
    coordinating, by the one or more processors, a second transportation vehicle to take each user from the safe location to the final destination.

5. The method of claim 1, further comprising:
    based on each user in the one or more groups accepting the pick-up location, dispatching, by the one or more processors, the first transportation vehicle.

6. The method of claim 5, further comprising:
    based on the one or more groups not accepting the pick-up location, sending, by the one or more processors, a new notification to another of the one or more groups.

7. The method of claim 1, further comprising:
    based on the identified danger zones, determining, by the one or more processors, an alternative safe location; and
    notifying, by the one or more processors, the transportation vehicle of the alternative safe location.

8. The method of claim 1, further comprising:
    based on the first location of two or more users in the plurality of users being similar, reorganizing the one or more groups.

9. The method of claim 1, wherein the first location further comprises a semi-permanent residence of each of the plurality of users and the safe location comprises shelters, hospitals, and the like.

10. A computer system for automatically coordinating transportation services, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
determining, by one or more processors, a first location corresponding to a permanent residence of a plurality of users;
receiving, by the one or more processors, a notification of an emergency situation;
identifying, by the one or more processors, danger zones within an emergency area associated with the emergency situation;
in response to receiving the notification of the emergency situation, determining, by the one or more processors, a second location corresponding to an immediate location of each of the plurality of users;
in response to the second location matching the emergency area, identifying, by the one or more processors, a safe location in close proximity to the emergency area and a safe evacuation route from the emergency area to the safe location;
organizing, by the one or more processors, the plurality of users in one or more groups based on a radius selected according to at least one of a proximity to the safe location, a proximity between the second location of at least two users of the plurality of users, and at least two or more users sharing the first location;
based on the identified danger zones, designating, by the one or more processors, a pick-up location for each of the one or more groups;
notifying via a Short Message Service (SMS), by the one or more processors, each user in the one or more groups of the designated pick-up location;
in response to the one or more groups accepting the designated pick-up location, automatically coordinating, by the one or more processors, a first transportation vehicle to take each of the one or more groups from the emergency area to the safe location; and
creating, by the one or more processors, a list of users from the one or more groups taken to the safe location to be provided to local authorities.

11. The computer system of claim 10, wherein the first location and the second location are determined using a global positioning system.

12. The computer system of claim 10, further comprising:
in response to the one or more groups arriving to the safe location, determining, by the one or more processors a final destination of each user in the one or more groups; and
coordinating, by the one or more processors, a second transportation vehicle to take each user from the safe location to the final destination.

13. The computer system of claim 10, further comprising:
based on each user in the one or more groups accepting the pick-up location, dispatching, by the one or more processors, the first transportation vehicle.

14. The computer system of claim 13, further comprising:
based on the one or more groups not accepting the pick-up location, sending, by the one or more processors, a new notification to another of the one or more groups.

15. The computer system of claim 10, further comprising:
based on the identified danger zones, determining, by the one or more processors, an alternative safe location; and
notifying, by the one or more processors, the transportation vehicle of the alternative safe location.

16. The computer system of claim 10, further comprising:
based on the first location of two or more users in the plurality of users being similar, reorganizing the one or more groups.

17. A computer program product for automatically coordinating transportation services, comprising:
a computer readable storage medium having program instructions embodied therewith, wherein the computer readable storage medium is not a transitory signal per se, the program instructions executable by a device to cause the device to perform a method comprising:
determining, by one or more processors, a first location corresponding to a permanent residence of a plurality of users;
receiving, by the one or more processors, a notification of an emergency situation;
identifying, by the one or more processors, danger zones within an emergency area associated with the emergency situation;
in response to receiving the notification of the emergency situation, determining, by the one or more processors, a second location corresponding to an immediate location of each of the plurality of users;
in response to the second location matching the emergency area, identifying, by the one or more processors, a safe location in close proximity to the emergency area and a safe evacuation route from the emergency area to the safe location;
organizing, by the one or more processors, the plurality of users in one or more groups based on a radius selected according to at least one of a proximity to the safe location, a proximity between the second location of at least two users of the plurality of users, and at least two or more users sharing the first location;
based on the identified danger zones, designating, by the one or more processors, a pick-up location for each of the one or more groups;
notifying via a Short Message Service (SMS), by the one or more processors, each user in the one or more groups of the designated pick-up location;
in response to the one or more groups accepting the designated pick-up location, automatically coordinating, by the one or more processors, a first transportation vehicle to take each of the one or more groups from the emergency area to the safe location; and
creating, by the one or more processors, a list of users from the one or more groups taken to the safe location to be provided to local authorities.

18. The computer program product of claim 17, wherein the first location and the second location are determined using a global positioning system.

19. The computer program product of claim 17, wherein the first location further comprises a semi-permanent residence of each of the plurality of users and the safe location comprises shelters, hospitals, and the like.

20. The computer program product of claim 17, further comprising:
in response to the one or more groups arriving to the safe location, determining, by the one or more processors a final destination of each user in the one or more groups; and coordinating, by the one or more processors, a second transportation vehicle to take each user from the safe location to the final destination.

\* \* \* \* \*